United States Patent
Wei

(10) Patent No.: US 7,752,500 B2
(45) Date of Patent: *Jul. 6, 2010

(54) METHOD AND APPARATUS FOR PROVIDING UPDATED PROCESSOR POLLING INFORMATION

(75) Inventor: Dong Wei, Granite Bay, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/339,646

(22) Filed: Dec. 19, 2008

(65) Prior Publication Data

US 2009/0100203 A1   Apr. 16, 2009

(51) Int. Cl.
*G06F 11/00* (2006.01)
(52) U.S. Cl. .............................. 714/36; 714/10; 714/47
(58) Field of Classification Search ................... 714/10, 714/36, 47
See application file for complete search history.

(56) References Cited

U.S. PATENT DOCUMENTS

| | | | |
|---|---|---|---|
| 4,683,531 | A | 7/1987 | Kelch et al. |
| 5,101,490 | A | 3/1992 | Getson et al. |
| 5,469,463 | A | 11/1995 | Polich et al. |
| 5,528,750 | A | 6/1996 | Lubart et al. |
| 5,966,304 | A | 10/1999 | Cook et al. |
| 6,012,151 | A | 1/2000 | Mano |
| 6,014,744 | A | 1/2000 | McKaughan et al. |
| 6,021,475 | A | 2/2000 | Nguyen et al. |
| 6,038,633 | A | 3/2000 | Tavallaei |
| 6,065,121 | A | 5/2000 | Hobson et al. |
| 6,233,680 | B1 | 5/2001 | Bossen et al. |
| 6,272,629 | B1 | 8/2001 | Stewart |
| 6,345,322 | B1 | 2/2002 | Humphrey |
| 6,347,372 | B1 | 2/2002 | Takashima et al. |
| 6,363,493 | B1 | 3/2002 | Williams |
| 6,393,582 | B1 | 5/2002 | Klecka et al. |
| 6,415,395 | B1 | 7/2002 | Varma et al. |
| 6,449,250 | B1 | 9/2002 | Otani et al. |
| 6,516,429 | B1 | 2/2003 | Bossen et al. |
| 6,574,748 | B1 | 6/2003 | Andress et al. |
| 6,598,179 | B1 | 7/2003 | Chirashnya et al. |
| 6,622,261 | B1 | 9/2003 | Laranjeira et al. |
| 6,701,464 | B2 | 3/2004 | Austen et al. |
| 6,708,297 | B1 | 3/2004 | Bassel |
| 6,725,396 | B2 | 4/2004 | Ahrens et al. |
| 6,745,346 | B2 | 6/2004 | Quach et al. |
| 6,807,643 | B2 | 10/2004 | Eckardt et al. |

(Continued)

FOREIGN PATENT DOCUMENTS

EP          0609990 A3      8/1994

(Continued)

*Primary Examiner*—Robert Beausoliel
*Assistant Examiner*—Elmira Mehrmanesh

(57) ABSTRACT

Embodiments of the invention provide a method and an apparatus to collect and dynamically update processor polling information. In one method embodiment, the present invention collects processor polling information at boot time to be provided to an operating system. The processor polling information describes operating conditions of an integrated processing system. The operating system is then notified that a triggering event has occurred that may potentially alter the operating conditions of the integrated processor system. Providing to the operating system updated processor polling information during runtime to reflect the operating conditions of the integrated processor system after the occurrence of the triggering event.

20 Claims, 5 Drawing Sheets

U.S. PATENT DOCUMENTS

| | | |
|---|---|---|
| 6,839,866 B2 | 1/2005 | Lerman |
| 6,948,094 B2 | 9/2005 | Schultz et al. |
| 6,983,362 B1 | 1/2006 | Kidder et al. |
| 7,117,396 B2 | 10/2006 | Komarla et al. |
| 7,131,029 B2 | 10/2006 | Quach et al. |
| 7,188,171 B2 | 3/2007 | Srinivasan et al. |
| 7,213,176 B2 | 5/2007 | Banko |
| 7,266,727 B2 | 9/2007 | Crowell et al. |
| 7,287,192 B1 | 10/2007 | Engel |
| 7,305,485 B2 | 12/2007 | Chang et al. |
| 2002/0065950 A1 | 5/2002 | Katz et al. |
| 2003/0041179 A1 | 2/2003 | Snead et al. |
| 2003/0093510 A1 | 5/2003 | Cen |
| 2003/0126516 A1 | 7/2003 | Komarla et al. |
| 2003/0163765 A1 | 8/2003 | Eckardt et al. |
| 2004/0019835 A1 | 1/2004 | Marisetty et al. |
| 2004/0184431 A1 | 9/2004 | Park |
| 2008/0235454 A1 | 9/2008 | Duron et al. |

FOREIGN PATENT DOCUMENTS

| | | |
|---|---|---|
| GB | 2225690 | 6/1990 |
| WO | WO-00/31667 | 6/2000 |

| Field | Byte Length | Byte Offset | Description |
|---|---|---|---|
| Header | | | |
| Signature | 4 | 0 | 'CPEP' Signature for the Corrected Platform Error Polling Table. |
| Length | 4 | 4 | Length, in bytes, of the entire Corrected Platform Error Polling Table. |
| Revision | 1 | 8 | 1 |
| Checksum | 1 | 9 | Entire table must sum to zero. |
| OEMID | 6 | 10 | OEM ID |
| OEM Table ID | 8 | 16 | For the Corrected Platform Error Polling Table, the table ID is the manufacturer model ID. |
| OEM Revision | 4 | 24 | OEM revision of Corrected Platform Error Polling Table for supplied OEM Table ID. |
| Creator ID | 4 | 28 | Vendor ID of utility that created the table. For tables containing Definition Blocks, this is the ID for the ASL Compiler. |
| Creator Revision | 4 | 32 | Revision of utility that created the table. For tables containing Definition Blocks, this is the revision for the ASL Compiler. |
| Reserved | 8 | 36 | Reserved, must be 0. |
| CPEP Structure[n] | --- | 44 | A list of CPEP structures for the platform. The CPEP structure is defined in the following section. |

FIG. 2

| Field | Byte Length | Byte Offset | Description |
|---|---|---|---|
| Type | 1 | 0 | 0-Corrected Platform Error Polling structure |
| Length | 1 | 1 | 8 |
| Processor ID | 1 | 2 | Processor ID of destination. |
| Processor EID | 1 | 3 | Processor EID of destination. |
| Polling Interval | 4 | 4 | Platform-suggested polling interval (in milliseconds) |

FIG. 3

METHOD AND APPARATUS FOR PROVIDING UPDATED PROCESSOR POLLING INFORMATION

RELATED APPLICATIONS

This patent application claims priority to and incorporates the contents of the co-pending U.S. patent application Ser. No. 10/737,111, and is entitled "METHOD AND APPARATUS FOR PROVIDING UPDATED PROCESSOR POLLING INFORMATION" by Dong WEI, filed on Dec. 15, 2003, and assigned to the assignee of the present invention. patent application Ser. No. 10/737,111 in turn claims priority from and herein incorporates by reference, U.S. provisional application No. 60/485,634, entitled "Corrected Platform Error Polling (CPEP) table specification", by inventor Dong WEI, filed on Jul. 7, 2003.

FIELD OF INVENTION

The present invention generally relates to computer systems and more specifically to a system and method for providing dynamically updated processor polling information for multi-processor systems.

BACKGROUND ART

Modern computers systems include classes of processors (e.g. Itanium™ based platforms) that may be able to correct and recover from certain kinds of processor and platform errors without crashing. Such platforms are referred to as platforms capable of handling corrected platform errors (CPEs). However, even though these systems are resilient to certain types of errors and continue operation despite the occurrence of the errors, there needs to be some accounting of the CPEs for use and analysis by the operating system or other manageability software.

One method of gathering CPE data is based on an interrupt polling model. In an interrupt model based system, the operating system is sent an interrupt upon the occurrence of an error. If the platform supports the interrupt model, the system firmware will need to communicate with the operating system through corrected platform error interrupt (CPEI) structures as defined in the Platform Interrupt Sources Structure of Advanced Configuration and Power Interface (ACPI) specification and the platform system abstraction layer specification. However, in some instances such as mission-critical server systems, the interrupt model for the corrected platform errors is not a preferred solution due to the potential of interrupt storms, in the case of the occurrence of a large number of simultaneous platform errors.

Therefore, an alternative mechanism for collecting corrected platform errors is needed to avoid potential problems such as interrupt storm. Additionally, a mechanism for storing and updating the CPE data is needed in conjunction with the new method of collecting CPE data for updating processor polling information changes due to dynamic reconfigurations of systems during runtime.

SUMMARY OF THE INVENTION

Embodiments of the invention provide a method and an apparatus to collect and dynamically update processor polling information. In one method embodiment, the present invention collects processor polling information at boot time to be provided to an operating system. The processor polling information describes operating conditions of an integrated processing system. The operating system is then notified that a triggering event has occurred that may potentially alter the operating conditions of the integrated processor system. Providing to the operating system updated processor polling information during runtime to reflect the operating conditions of the integrated processor system after the occurrence of the triggering event.

BRIEF DESCRIPTION OF THE DRAWINGS

The accompanying drawings, which are incorporated in and form a part of this application, illustrate embodiments of the present invention, and together with the description, serve to explain the principles of the invention. Unless noted, the drawings referred to this description should be understood as not being drawn to scale.

FIG. 2 shows an exemplary CPEP table according to an embodiment of the present invention.

FIG. 3 shows an exemplary CPEP structure according to an embodiment of the present invention.

DETAILED DESCRIPTION OF THE INVENTION

This invention provides a full solution (both the boot time snapshot and runtime update mechanism) to instruct the operating system (OS) which processors to poll for processor status and operation data, and at what intervals to perform such polling. As such, embodiments in accordance with the present invention provide for an efficient and updatable model for polling individual processors within a multiprocessor platform, without the problems associated with interrupt based models, including potential interrupt storms.

Many modern applications use multiprocessor and multi-cell integrated systems or platforms. A platform may consist of several cells, each of which may include anywhere from one to several processors. In the case of many of these larger systems, the cells and processors comprising the platform may work in parallel. Additionally, the cells and processors comprising the integrated processor system may need to work independently of each other. This is especially necessary in the case of many mission critical systems and applications that must be fault tolerant and/or easily expandable and upgradeable. Requirements of the mission critical and easily expandable systems have led to the development of platforms with the ability to correct and recover from certain types of system errors. These corrected errors are also referred to as corrected platform errors (CPEs).

The management functions of these complex systems are under the control of an operating system (OS). In order to properly manage and allocate resources within the platform, the operating system needs to obtain up to date information on the status and performance of each cell and processor comprising the integrated processor system or platform.

One method of collecting data on the status or performance of individual processors within an integrated processor system is based on an interrupt model. Under an interrupt based system of information collection, each processor may send an interrupt signal to the operating system upon the occurrence of an event. The types of event that may require the generation of an interrupt could vary from system to system. However, these interrupt based systems share one potential problem. The problem is based on the potential of an interrupt storm caused by the simultaneous generation of a large number of platform errors.

An alternative model for collecting processor status and performance information is based on a polling model. Under the polling model, no information is sent to the operating system upon the occurrence of an event. Instead, in a polling model based system, the operating system polls selected processors within the integrated processor system at determined time intervals in order to collect processor status and/or performance information. This avoids the potential for an interrupt storm, as may occur with the interrupt model based system.

Figure 1:
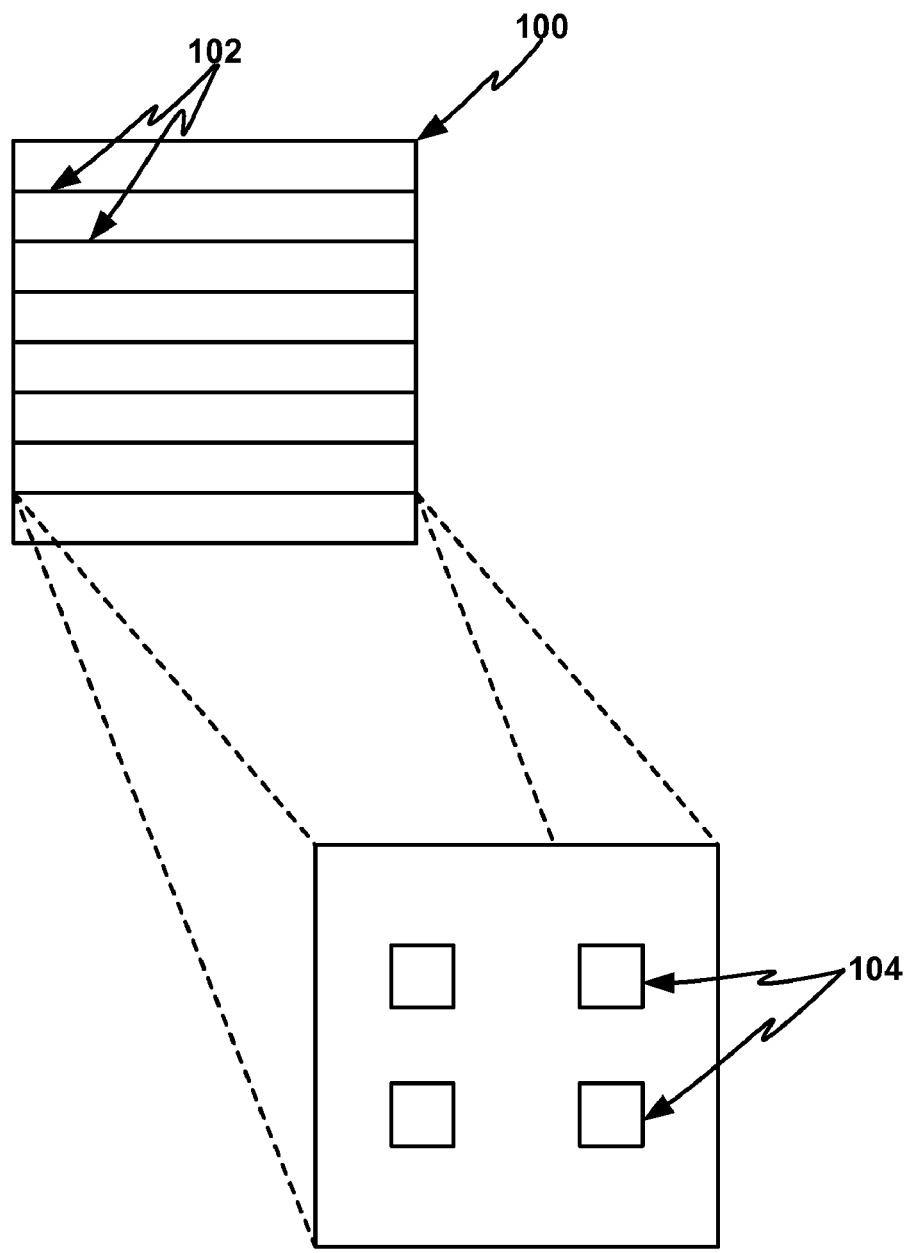
FIG. 1 illustrates an example of a multi-cell platform benefiting from the polling method for collection of processor polling information according to one embodiment of the present invention.

FIG. 1 illustrates an example of a multi-cell platform benefiting from the polling method for collection of processor polling information according to one embodiment of the present invention. As shown in FIG. 1, an integrated processor system or platform 100 may include multiple cells or blades 102, each of which may include multiple processors 104. Some modern systems, including many mission critical systems have to be both stable and expandable. As such, a system like the system of FIG. 1 may be designed to allow online changes in the configuration of the system by adding cells or deleting cells during runtime. At the same time, if cells and processors generate excessive errors, the system may allow the online deconfiguration of faulty cells and processors.

The information collected from processors within the integrated processor system based on a polling method may generically be referred to as processor polling information. A sub-category of processor polling information includes data related to corrected platform errors (CPEs). Many of the newer computer systems have the ability to correct and recover from certain kinds of errors. These corrected errors may be referred to as CPEs. The corrected platform errors reflect the operating conditions of an integrated processing system. Thus, information regarding these corrected platform errors must still be gathered for various purposes including error analysis. An alternative means of collecting CPE data is through the polling model. However, the polling model has not been addressed in detail in the industry standard interface, Advanced Configuration and Power Interface Specification (ACPI) v2.0. Similarly, most hardware specifications also fail to provide a structure supporting an efficient implementation of the polling model. As a result, the default setting for collecting processor status and performance information, including CPEs, in a polling model based system under ACPI standard would require polling of every processor in the integrated processor system. However, in many cases, polling every processor is very tedious, time consuming, and can result in duplication of work. The larger the system, the greater the burden of this default setting is on the overall system performance.

According to embodiments of the present invention, a more efficient polling model is provided based on the development of a specification for a firmware interface referred to as a Corrected Platform Error Polling (CPEP) table.

FIG. 2 shows an exemplary CPEP table according to an embodiment of the present invention. The CPEP table is used to communicate to the operating system which processor to poll from for collecting corrected platform errors data. The information available in the CPEP table allows the operating system to only poll from the processors described in the table, instead of all the processors in the system. The savings to the operating system could be significant. For example, the operating system may only need to poll from one processor in a cell which contains four processors, thus allowing for savings of up to seventy five percent. In one embodiment, using the information stored in the CPEP table, the OS invokes a procedure called SAL_GET_STATE_INFO to inquire polling information related to and gathered by each processor listed in the CPEP table.

The CPEP table includes sub-structures referred to as CPEP structures. FIG. 3 shows an exemplary CPEP structure according to an embodiment of the present invention. The CPEP table contains one or more CPEP structures. Each CPEP structure contains information used to suggest to the operating system, the processor to be polled (identified by the processor's local identification), and its corresponding platform-suggested polling interval. The polling interval value is each platform's advice to the OS on recommended polling interval, based on the hardware configuration. However, the OS could have its own policy about polling. For example, the OS can poll more often than the platform-suggested intervals. The OS can also poll uniformly on all the specified processors using an interval that is shorter than the platform-suggested intervals.

Thus, the operating system may use the information available in the CPEP table to exclusively and efficiently poll from only those processors described in the table rather than from all processors in the platform. However, conventionally, the CPEP table is static and only reports the status of the hardware, during system boot time before handoff to the operating system. Embodiments in accordance with the present invention, however, provide systems and methods for updating processor polling information (including the information available in a CPEP table) during runtime.

Newer systems with more advanced technologies allow for dynamic partitioning of the integrated processor system. Additionally, these newer platforms may support online or runtime addition or Hot Plug of processors as well as online deletions. A multi-cell platform may receive additional cells or blades as the system usage increases, without the need to shut down the entire system. Cells, blades and processors may be deleted from the integrated system because of burn out, servicing, or reduced demand on the system resources. The occurrence of these events would affect the integrated system configuration during runtime.

Additionally, platforms may support runtime processor deconfiguration, when a processor is generating too many errors. Thus, a processor, a cell or a whole bank of processors or cells may be deconfigured during runtime, without the necessitating a system shut down. In these cases, it is not appropriate to continue to poll from the deconfigured processors.

Thus, in cases such as runtime or online addition, deletion and deconfiguration of processors among others, the information in a conventional CPEP table becomes stale and will not be up to date after the online reconfiguration. This is because the data populating the CPEP table only includes information collected during boot time. Unlike the present embodiment, in a conventional approach, this information is provided to the operating system, during firmware to operating system handoff, through the CPEP table interface. With the possibility of runtime changes in the system configuration, means for collecting and providing updated processor polling data, including CPEP table data, to the operating system, after the boot time, is therefore needed. Embodiments in accordance with the present invention provide the ability to provide updated processor polling data, including CPEP table data, to the operating system after boot time.

Figure 4:
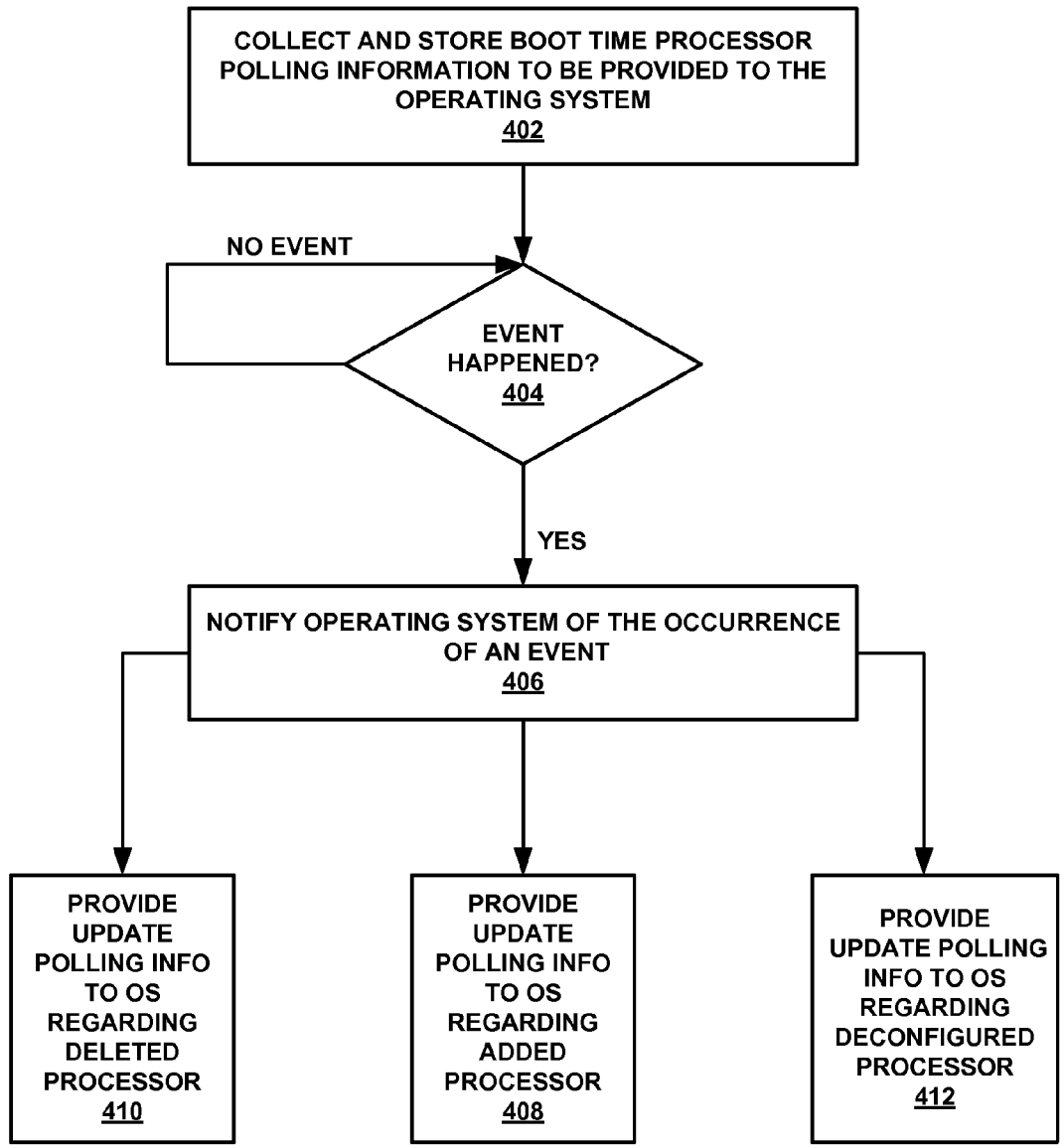
FIG. 4 is a flow chart of a method for updating processor polling information according to an embodiment of the present invention.

More specifically, FIG. 4 is a flow chart of a method for updating processor polling information according to an embodiment of the present invention. As shown in FIG. 4, in a first step 402, processor polling information collected at boot time is provided to the operating system. Processor polling information may be collected by each processor within the integrated processor platform, for presentation to the operating system. The operating system obtains the collected processor polling data and stores it in its own database for future use.

According to embodiments of the present invention, a firmware interface structure acts as an interface between the hardware and the operating system, facilitating communication and data transfer between the two. Thus, the firmware interface structure is used to communicate collected processor polling data to the operating system.

In one embodiment of the present invention based on the ACPI standard, the processor polling interface structure is a CPEP table. The CPEP table is an added structure and substitutes and/or complements a corrected platform error interrupt (CPEI) structure that may be available in systems based on the ACPI interface standards. In systems using an interrupt model for collecting processor state and performance data, a firmware to operating system (software) interface structure is needed. Under the industry accepted ACPI standards, that firmware structure is the CPEI. Platforms that do not have CPEI structure defined as required by the ACPI interface specification, or platforms that rely on a polling model of data gathering may use an interface structure such as the CPEP table to provide a snap shot of the integrated processor system, at boot time, to the operating system, to be used as a guide for which processors to poll for CPES, and at what polling interval.

The use of polling in obtaining CPEs data may be preferable to an interrupt based system because it avoids the potential problem of interrupt storms in cases where numerous CPEs may occur at the same time. Furthermore, the use of a structure such as the CPEP table allows for the efficient polling of the system for CPEs, since the table would provide the information about which processors to poll from and at what frequency to perform the polling.

In one embodiment of the present invention, once the operating system receives the boot time polling information that has been collected into a firmware interface such as the CPEP table and CPEP structure, it transfers the data into its registries or databases for future use. Based on the information stored in its database, the operating system can determine an efficient polling scenario and frequency. The data provided to the operating system by the firmware interface acts only as a guide and does not have to be followed by the operating system. Thus, the OS may elect to poll from all the processors in the system, or poll at a frequency greater or less than the value provided to it through the firmware interface.

Referring back to FIG. 4, in the same embodiment of the present invention, in step 404, the system remains in a loop, until the occurrence of an event that may have potentially altered the state of the system. An example of such an event may be the addition, deletion or deconfiguration of processors during runtime. As previously discussed, the occurrence of such events may alter and thus cause the boot time collected processor polling information provided to the operating system to become stale. In an alternative embodiment, the system may not rely on an event driven approach. Instead, the operating system may poll the firmware interface regularly for the occurrence of an event that may potentially alter the system configuration.

In step 406 of the same embodiment of the present invention, upon the occurrence of an event with the potential of altering the state of the system, the operating system is notified. Some of the events with the potential to affect the system include for example, a hot plug or online addition of a processor or cell, the online deletion of a processor or cell, and the online deconfiguration of a processor or a cell (in the case of a processor generating excessive number of errors), among other things.

Process 408 applies in one embodiment of the present invention, in the case of an online addition of one or several processors. In the case of an online addition of a processor, the operating system receives an indication of the occurrence of the event through a "Bus Check notification." When the Bus Check notification is performed on a device object, it indicates to the OS that it needs to perform a "Plug and Play" re-enumeration operation on the device tree, starting from the point where it has been notified. In one embodiment, if the online addition involves the addition of processors, the OS can invoke procedures or objects associated with the added processors that return updated values for processor polling information data.

In one embodiment of the present invention, the operating system invokes a Poll for corrected Platform Error (_PPE) object associated with a corresponding the added processor. A _ PPE object is associated with a processor object or processor device and serves as a way to provide to the operating system updated processor polling data that supercede the boot time processor polling information. In the description of a name space based on the ACPI standard, every processor in the integrated processor system may be included. In one embodiment, a _PPE object is associated with this name space and returns a DWORD integer value corresponding to each processor in the name space. When the return value of the _PPE object is zero, it indicates to the operating system that it need not poll from the associated processor. In the case of a non-zero value returned by the _PPE object, it indicates to the operating system to poll from this processor at an interval that is smaller than the return value. The units of the return value are in milliseconds.

Correspondingly, in one embodiment of the present invention, in the case of an online deletion of a processor, in process 410, the operating system needs to perform a plug and play re-enumeration operation upon the receipt of an "Eject Request" notification. Since the online deletion involves one or more processors being deleted, the operating system removes the processors from its internal structure for processor polling including polling for CPEs.

In one embodiment of the present invention, process 412 applies in the case of an online deconfiguration. Processors can be deconfigured during runtime due to error. Even though the deconfiguration takes place for the next boot, it may be recommended that the operating system no longer poll CPEs from the deconfigured processor.

In one embodiment, a new notification value CPEP Check is defined and used to notify the operating system of the occurrence of an event that may potentially alter the system. The CPEP Check value is sent to a device object, which in turn indicates to the operating system that it needs to invoke the _PPE object. In turn, the operating system invokes _PPE objects associated with the processors on the device tree starting from the point where it has been notified. Each _PPE object associated with a deconfigured processor will return a zero value indicating to the operating system that the corresponding processor need not be polled from. This also allows for alternative processors to perform CPE polling.

Figure 5:
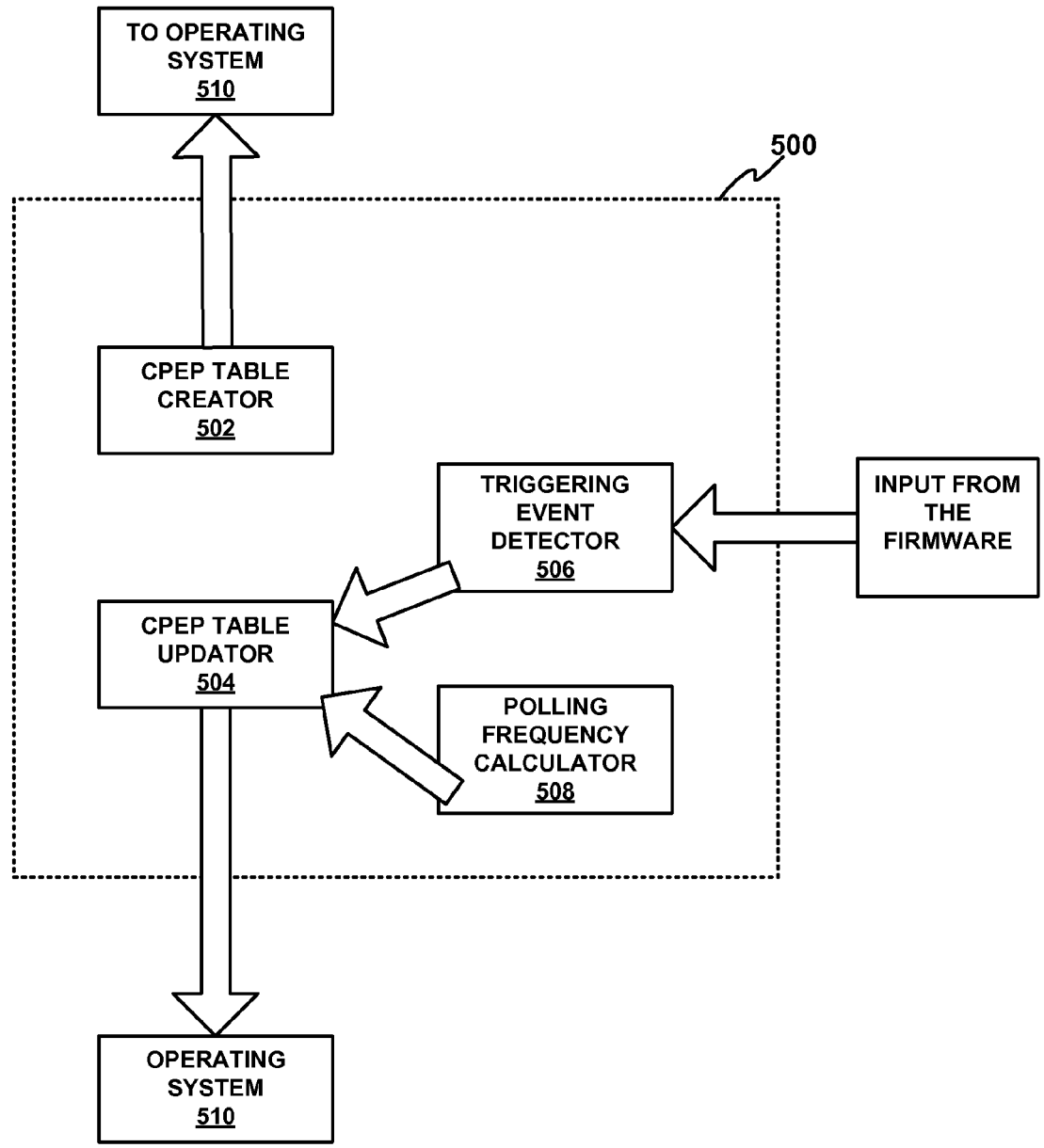
FIG. 5 is a block diagram of a system for updating processor polling information according to an embodiment of the present invention.

FIG. 5 is a block diagram of a system according to an embodiment of the present invention. As shown in FIG. 5, the processor polling information system 500 includes a CPEP table creator 502, a CPEP table updator 504, a triggering event detector 506 and a polling frequency calculator 508.

In one embodiment of the present invention, at boot time, the CPEP table creator 502 collects system data to be organized into a CPEP table structure, for presentation and use by the operating system 510. The CPEP table data is provided to the operating system 510 during boot time, at firmware hand-off to the operating system 510.

In one embodiment of the present invention, the triggering event detector 506 detects the occurrence of an event that may potentially affect the platform configuration and polling for CPEs. Upon the occurrence of the detected event(s), the triggering event detector 506 notifies the operating system 510 through a CPEP table updator 504 that the boot time information received through the CPEP table creator 502 may have become stale. Input from the firmware in the form of Bus Check notification in the case of an online hot plug, Eject Request notification in the case of an online deletion, and CPEP Check notification in the case of an online deconfiguration may be sent to the triggering event detector 506 by the hardware. In an alternative embodiment, the triggering event detector 506 directly notifies the operating system 510 of the occurrence of an event and the need to potentially update the information available.

Upon the receipt of the notification of the occurrence of an event through the triggering event detector 506, the CPEP table updator 504 collects runtime information relating to the processors affected by the occurrence of the event. In one embodiment, the collection of updated processor polling information for the collection of CPE data may be through the use of a _PPE object corresponding to each of the affected processors.

In one embodiment of the present invention, in the case of an online addition of a processor, a polling frequency calculator 508 may be used to calculate the recommended minimum polling frequency for a processor added during a hot plug. The value provided by the polling frequency calculator 508 may be used by the CPEP table updator to provide updated polling information to the operating system 510, after the occurrence of an event.

In one embodiment of the present invention, in the case of an online deletion or a runtime deconfiguration of a processor, the frequency calculator 508 returns a zero value for the polling frequency for the corresponding deleted or deconfigured processor. This zero return value indicates to the operating system 510 that the associated processors need not be polled for CPEs.

The teachings of the various embodiments of the present invention allow for the collection of CPE data using a polling model that is efficient and updatable. The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

I claim:

1. A method for providing updated processor polling information comprising:
    collecting processor polling information at boot time to be provided to an operating system, said processor polling information describing operating conditions of an integrated processing system;
    notifying the operating system that a triggering event has occurred, wherein said triggering event alters said operating conditions of said integrated processor system; and
    providing a firmware interface structure with updated processor polling information during runtime to said operating system, said updated processor polling information reflecting operating conditions of said integrated processor system after the occurrence of the triggering event.

2. The method of claim 1 further comprising:
    creating a processor polling information table, wherein said processor polling information table is populated with processor polling information collected at boot time.

3. The method of claim 1 wherein the triggering event is based on an addition of a processor device.

4. The method of claim 1 wherein the triggering event is based on a deletion of a processor device.

5. The method of claim 1 wherein the triggering event is based on a deconfiguration of a processor device.

6. The method of claim 1 further comprising:
    performing a process on an object associated with a processor device and returning a value to an operating system of said integrated processor system, wherein said value supercedes a processor polling information that corresponds to said processor device.

7. The method of claim 6 wherein the value that is returned is a zero indicating that the processor device is not to be polled.

8. The method of claim 7 wherein the value that is returned is a non-zero number indicating a minimum polling frequency.

9. A computer program embodied on a computer readable medium for providing updated processors polling information, the computer program causing a computer to perform the steps of:
    creating a firmware interface structure, said firmware interface structure being populated with boot time processor polling information, wherein said processor polling information describes operating conditions of an integrated processing system; and
    updating said firmware interface structure upon receipt of a notification that a triggering event has occurred, wherein said triggering event may potentially alter said operating conditions of said integrated processor system.

10. The computer program of claim 9 wherein said computer program further causes said computer to:
    invoke a bus check notification upon an online addition of a processor device, wherein said bus check notification indicates to an operating system that a re-enumeration of a device tree needs to be performed, and wherein said operating system invokes a polling frequency procedure that returns a value indicating a polling frequency for said added processor device.

11. The computer program of claim 9 wherein said computer program further causes a computer to:

invoke an eject request notification upon an online deletion of a processor device, wherein said eject request notification indicates to an operating system to update a processor polling information table associated with said processor device and not poll from said processor device which has been deleted.

12. The computer program of claim 9 wherein said computer program further causes a computer to:

invoke a processor polling information check notification invoked by an online deconfiguration of a faulty processor device, wherein said processor polling information check notification indicates to an operating system to invoke a polling frequency procedure indicating, to said operating system, alternative processor devices to be polled.

13. The computer program of claim 9 wherein said computer program further causes a computer to:

invoke a polling frequency procedure object associated with a processor device, wherein said polling frequency procedure object returns a value that supercedes a processor polling information table that corresponds to said processor device.

14. The computer program of claim 13 wherein a zero return value indicates that said processor is not to be polled.

15. The computer program of claim 13 wherein a non-zero return value indicates a minimum polling frequency.

16. An apparatus for updating processor polling information comprising:

a processor polling information table creator for creating a processor polling information table coupled to an operating system, said processor polling information table being populated with boot time processor polling information, wherein said processor polling information describes operating conditions of an integrated processor system;

a triggering event detector coupled to said operating system, said triggering event detector capable of detecting an occurrence of a triggering event, where said triggering event altered said operating condition of said integrated processor system; and a processor polling information table updator coupled to said operating system and further coupled to said triggering event detector, wherein, upon a receipt of a notification of an occurrence of a triggering event from said triggering event detector, said processor polling information table updator provides processor polling information to said operating system based on said altered operating conditions.

17. The apparatus of claim 16 wherein the triggering event detector is configured to detect an event triggered by a status change of a processor device, wherein said status change is selected from a group consisting of addition of said processor device and deletion of said processor device.

18. The apparatus of claim 16 wherein the triggering event detector is further configured to detect an event based on a deconfiguration of a processor device.

19. The apparatus of claim 16 further comprising:

a polling frequency calculator coupled to said processor polling information table updator, said polling frequency calculator configured to return a value that indicates a minimum polling frequency for a selected processor device.

20. The apparatus of claim 19 wherein said polling frequency calculator is configured to forgo polling said selected processor device when said polling frequency calculator returns a zero value for said selected processor device.

* * * * *